United States Patent [19]
Roberts

[11] 3,939,373
[45] Feb. 17, 1976

[54] FIXED GAP SPEED SENSOR

[75] Inventor: James K. Roberts, South Bend, Ind.

[73] Assignee: The Bendix Corporation, South Bend, Ind.

[22] Filed: Oct. 29, 1974

[21] Appl. No.: 518,668

[52] U.S. Cl. ............................................. 310/168
[51] Int. Cl.² ...................................... H02K 19/20
[58] Field of Search .............. 310/42, 43, 168, 155; 324/173, 174

[56] References Cited
UNITED STATES PATENTS

| | | |
|---|---|---|
| 3,256,590 | 6/1966 | Myers .............................. 310/43 X |
| 3,473,120 | 10/1969 | Ruof .................................... 310/158 |
| 3,719,841 | 3/1973 | Ritsema .............................. 310/155 |
| 3,772,549 | 11/1973 | Cumming ........................... 310/168 |
| 3,870,911 | 3/1975 | Toyama et al. ..................... 310/155 |

*Primary Examiner*—Donovan F. Duggan
*Attorney, Agent, or Firm*—Ken C. Decker; S. H. Hartz

[57] ABSTRACT

A wheel speed sensor for use in an adaptive braking system has a tone wheel mounted on the wheel hub and a pick-up secured to a bracket having a locating aperture for mounting the bracket on the machined seal surface of the spindle. The bracket accurately positions the pick-up relative to the tone wheel on the hub so that no adjustment of the pick-up relative to the tone wheel is required.

1 Claim, 2 Drawing Figures

FIXED GAP SPEED SENSOR

FIELD OF THE INVENTION

The invention relates to adaptive braking systems for use on automotive vehicles and more particularly to a speed sensor therefor which provides the adaptive braking system with information relative to the speed and acceleration of the vehicle wheels. An adaptive braking system of the type in which the invention may be used is shown and described in U.S. Pat. No. 3,494,673.

PRIOR ART

Wheel speed sensors of the frictionless type as described in U.S. Pat. Nos. 3,626,226; 3,626,227; and 2,626,228 include a tone wheel mounted for rotation with the vehicle wheel and a pick-up closely associated with the tone wheel. The relative position of the pick-up and the tone wheel is critical and the speed sensors shown and described in the above patents require means for making this critical adjustment.

SUMMARY OF THE INVENTION

One object of the present invention is to provide a mounting for the pick-up which accurately positions the pick-up relative to the tone wheel without adjustment.

Another object of the invention is to provide a simple means for attaching the pick-up to an automotive vehicle without appreciably altering the vehicle.

Another object of the invention is to provide a wheel speed sensor particularly adapted for use on the front wheels of a vehicle equipped with disc brakes.

The invention contemplates a device for sensing the speed of a wheel having a hub rotating on a spindle, comprising a tone wheel mounted on the hub, a pick-up for sensing the speed of rotation of the tone wheel and providing signals corresponding thereto, and a bracket for supporting the pick-up having a locating aperture for mounting the bracket on the spindle and for accurately positioning the pick-up relative to the tone wheel to avoid adjustment of the pick-up relative to the tone wheel.

DETAILED DESCRIPTION OF THE INVENTION

Figure 1:
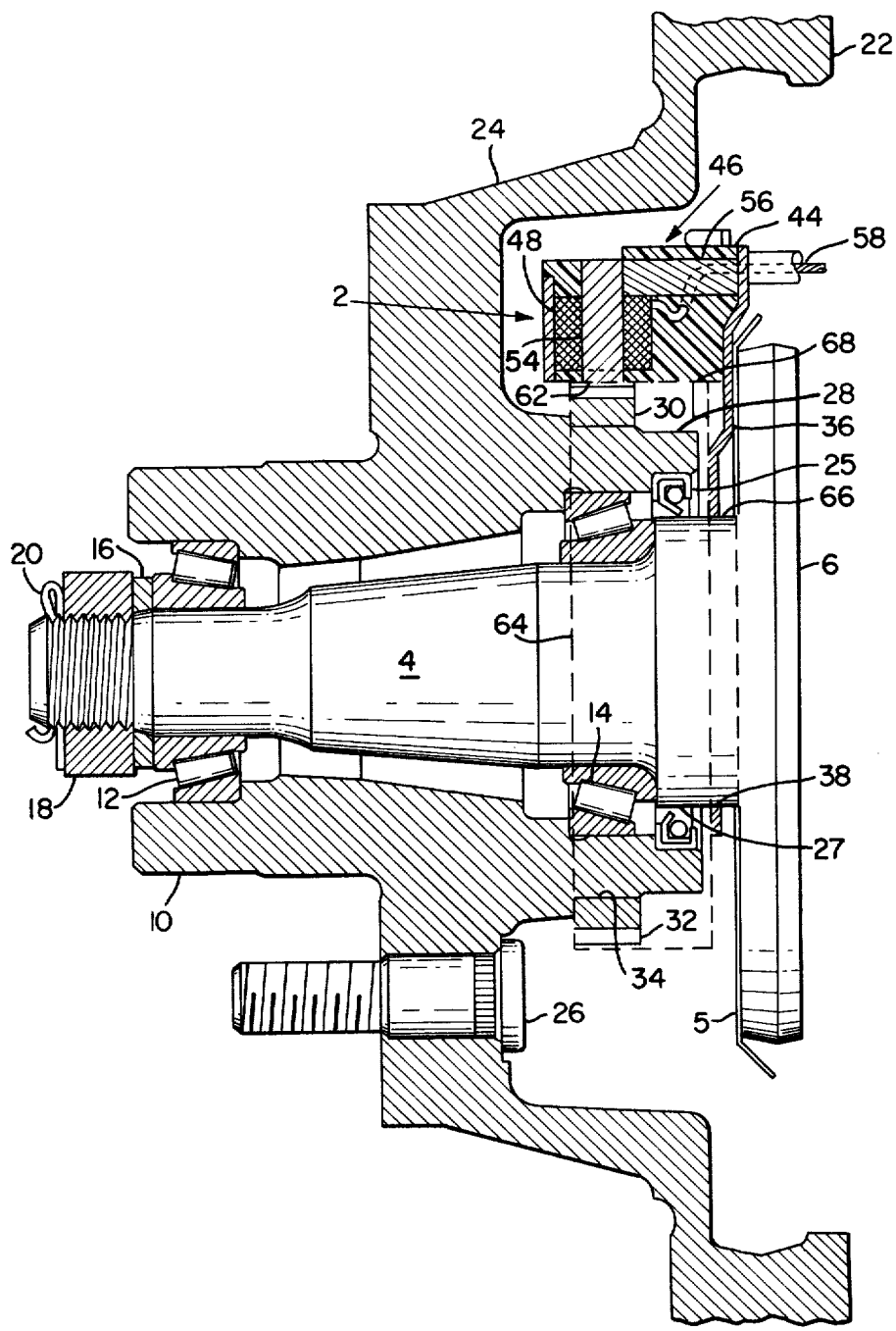
FIG. 1 is a vertical section showing a wheel speed sensor assembled to the front wheel hub and spindle assembly according to the invention.
Figure 2:
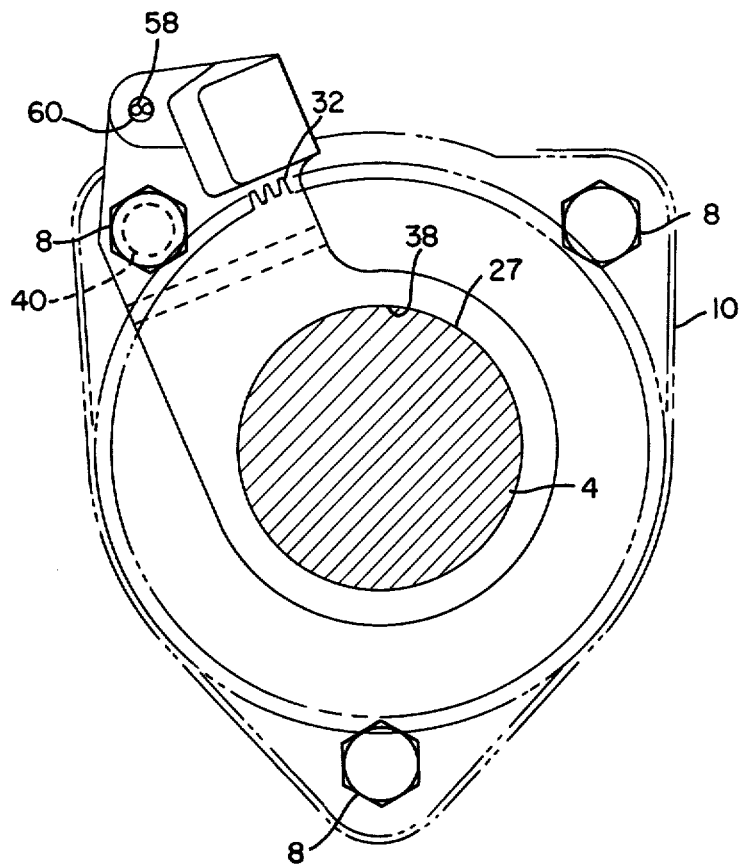
FIG. 2 is an end view partly in section showing the structure of FIG. 1.

Referring to the drawing, shown therein is a front wheel suspension provided with a speed sensor 2 constructed according to the invention. A spindle 4 and splash shield 5 are bolted to a spindle carrier 6 by bolts 8. A wheel hub 10 is rotatably mounted on spindle 4 by tapered roller bearings 12 and 14 secured by the usual washer 16, castellated nut 18 and cotter pin 20. A ventilated brake disc 22 including an offset portion 24 is secured to or made integral with hub 10. A seal 25 is pressed into hub 10 and engages a concentric machined surface 27 on spindle 4. A wheel (not shown) may be secured to the hub by bolts 26 in the usual manner. An outer surface of hub 10 is machined at 28 so that it is concentric with the bearing diameter.

Speed sensor 2 includes a ring shaped tone wheel 30 made of magnetic material and having a plurality of equally spaced teeth 32 formed in the outer surface thereof. A molded adhesive non-magnetic material fills the spaces between teeth 32. The inner surface 34 of tone wheel 30 is machined to a press fit diameter relative to the machined surface 28 of hub 10 and is pressed on the hub.

A bracket 36 has a locating aperture 38 which is accurately machined for mounting the bracket on the seal surface 27 of spindle 4 adjacent spindle carrier 6. The bracket has a second aperture 40 for receiving one of the bolts 8 which secures the spindle, bracket and splash shield 5 to spindle carrier 6. A nest 44 for holding a pick-up 46 is formed at one end of bracket 36. The pick-up may include a coil of fine wire 48 wound on a rectangular pole piece 54 engaging a cylindrical permanent magnet 56. Leads 58 from coil 48 extend through aperture 60 in nest 44 for connection to external circuitry. All of the above parts may be permanently secured in nest 44 by potting with a suitable epoxy resin as described hereinafter. Pole pieces 54 projects through the open end of nest 44 and the projecting end is formed with teeth 62 similar in shape and spacing to teeth 32 on tone wheel 30.

Pick-up 46 may be assembled to nest 44 on bracket 36 before assembling the bracket to the vehicle by using a stepped plug 64 shown by broken lines in the drawing with a diameter 66 mating closely with locating aperture 38 in bracket 36 and a surface 68 having a radius corresponding to the radius of tone wheel 30 plus a suitable gap between the tone wheel and pick-up 46. The diameter 66 of stepped plug 64 is inserted in locating aperture 38 of bracket 36 and pole piece 54 of pick-up 46 is clamped securely against the surface 68 of the stepped plug and the entire assembly is inserted into a potting mold and potting compound is injected into the mold and allowed to cure whereupon the assembly is removed. With this arrangement the potted assembly is accurately dimensioned.

Rotation of hub 10 causes teeth 32 of tone wheel 30 to periodically align with teeth 62 of pick-up pole piece 54 producing changes in magnetic flux in teeth 62 to produce an alternating voltage in coil 48 which is transmitted by leads 58 to a suitable conventional computer (not shown) of the adaptive braking system.

Since the bearing inner diameter to outer diameter concentricity is held quite closely on commercial bearings for the front wheels of a vehicle and since the spindle manufacturer holds the bearing and seal diameters to small tolerances for eccentric runout, all the dimensions involved in establishing the gap between the pick-up and tone wheel are of small tolerances and no gap adjustment is needed to compensate for these tolerances.

What is claimed is:

1. A device for sensing the speed of a wheel having a hub rotating on a spindle, comprising a tone wheel including a ring shaped member mounted on the wheel hub, the member being made of magnetic material with teeth formed in the outer periphery and the inner surface of the ring shaped member engaging a portion of the wheel hub which is concentric with the hub axis, a pick-up for sensing the speed of rotation of the tone wheel and providing signals corresponding thereto, a bracket having a nest for receiving the pick-up and having a locating aperture for mounting the bracket on a hub seal surface on the spindle, the pick-up being potted in the nest with a potting compound in a position to provide a suitable gap between the tone wheel and pick-up to avoid adjustment of the pick-up relative to the tone wheel after assembly of the bracket to the spindle, the pick-up being accurately positioned in the nest during potting by clamping the pick-up to a surface of a stepped plug having a radius corresponding to the radius of the tone wheel plus a suitable gap between the tone wheel and pick-up while the locating aperture in the bracket is closely mated on a diameter on the stepped plug.

* * * * *